United States Patent [19]
Hartel

[11] 3,822,048
[45] July 2, 1974

[54] MAIN LANDING GEAR
[75] Inventor: Erwin H. Hartel, Brunswick, Ohio
[73] Assignee: Pneumo Dynamics Corporation, Boston, Mass.
[22] Filed: Mar. 2, 1973
[21] Appl. No.: 337,454

[52] U.S. Cl. ............................................. 244/104 R
[51] Int. Cl. ............................................ B64c 25/60
[58] Field of Search .......... 244/102, 103, 104, 100, 244/101, 17.17, 104 R, 102 R, 100 R

[56] References Cited
UNITED STATES PATENTS
| | | | |
|---|---|---|---|
| 1,955,142 | 4/1934 | Minshall et al. | 244/104 R |
| 2,233,191 | 2/1941 | Arcier et al. | 244/104 R |
| 2,752,112 | 6/1956 | Payne, Jr. | 244/102 R |
| 3,121,547 | 2/1964 | Paxhia et al. | 244/102 R |

Primary Examiner—Milton Buchler
Assistant Examiner—Paul E. Sauberer
Attorney, Agent, or Firm—Donnelly, Maky, Renner & Otto

[57] ABSTRACT

A main landing gear for helicopters and the like includes a pivotal oleo strut having a cylinder and projecting piston rod, a tire mounted on the free end of the piston rod, and a linkage assembly for controlling the extension of the piston rod according to the pivotal position of the oleo strut relative to the fuselage, whereby the ground engagement portion of the tire tread is maintained in a substantially vertical plane of fixed lateral distance from the helicopter fuselage during all landing and support modes of the landing gear. In two embodiments of the invention, the tire is mounted on a wheel support that is pivotally controlled by the linkage assembly during landing gear retraction to throw the mid circumferential plane of the tire into an orientation substantially parallel to the axis of the oleo strut.

10 Claims, 11 Drawing Figures

MAIN LANDING GEAR

The present invention relates as indicated to a main landing gear for vertical take-off aircraft, such as helicopters, although such landing gear may readily be employed on conventional airplanes.

Landing gear for vertical take-off aircraft are subjected to high loading forces upon landing and support modes, and the ground engagement portion of the tire on such landing gear should be maintained a fixed lateral distance from the fuselage during such modes for best operational performance and tire life. At least two basic forms of landing gear have been developed in attempts to maintain the desired relationship between the wheel assembly with mounted tire and the fuselage.

The first form contemplates side articulation of the wheel assembly to compensate for the horizontal motion vectors relative to the fuselage experienced during landing. Reference may be had to Jensen U.S. Pat. No. 2,984,437 and Hartel U.S. Pat. No. 2,973,168 for disclosures of landing gears designed to cancel out an outwardly directed motion vector caused by upward pivoting of the landing gear by an inwardly directed movement effected by pivoting or side articulation of the wheel support. Paxhia U.S. Pat. No. 3,121,547, on the other hand, discloses outward articulation of the wheel support or assembly to compensate for inward telescopic movement of a piston rod projecting from the shock absorbing oleo strut, such inward telescopic movement resulting from compressive landing forces.

The second form of landing gear utilizes longitudinal, upwardly directed, arcuate movement of the wheel assembly to maintain the desired relationship between tire and fuselage. Reference may be had for example to Katzenberger, U.S. Pat. No. 2,691,496 wherein the wheel assembly is mounted by two fixed length struts to the fuselage, such struts being adapted to allow slight longitudinal arcuate movement of the whole landing gear upon ground engagement.

The present invention contemplates a completely new form of landing gear wherein an oleo strut and cooperative linkage assembly are used substantially exclusively to control and maintain the required relationships. Upon landing, such oleo strut is allowed to pivot upwardly relative to the fuselage, which without compensation, would result in the wheel assembly moving arcuately outwardly from the fuselage. However, the outwardly directed horizontal vector of such arcuate movement is compensated for by a linkage assembly accurately controlling the telescopic position of the piston rod relative to the cylinder of the oleo strut.

The principal object of the present invention is to provide a landing gear operative, during landing and support modes, to maintain the ground engagement portion of the tire a fixed lateral distance from the aircraft fuselage while permitting vertical movement of the same.

It is another important object of the present invention to compensate for variations in lateral wheel distance from the fuselage by an oleo strut with controlled piston rod extension according to the pivotal position of such oleo strut relative to the fuselage. Such control is generally effected by a linkage assembly having two substantially vertically aligned fixed length struts pivoting about two different fulcrum points on the fuselage, such fixed length struts cooperating with a linkage coupled between the cylinder and piston rod of the oleo strut to control the relative extension of the latter.

It is yet another object of the present invention to control the angular position of the wheel support during landing gear retraction by an extension of the linkage assembly. The linkage assembly extension disclosed herein is operative to throw the pivotal wheel support into a position in which the mid circumferential plane of the tire is substantially parallel to the axis of the oleo strut.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

Figures 1, 1A:
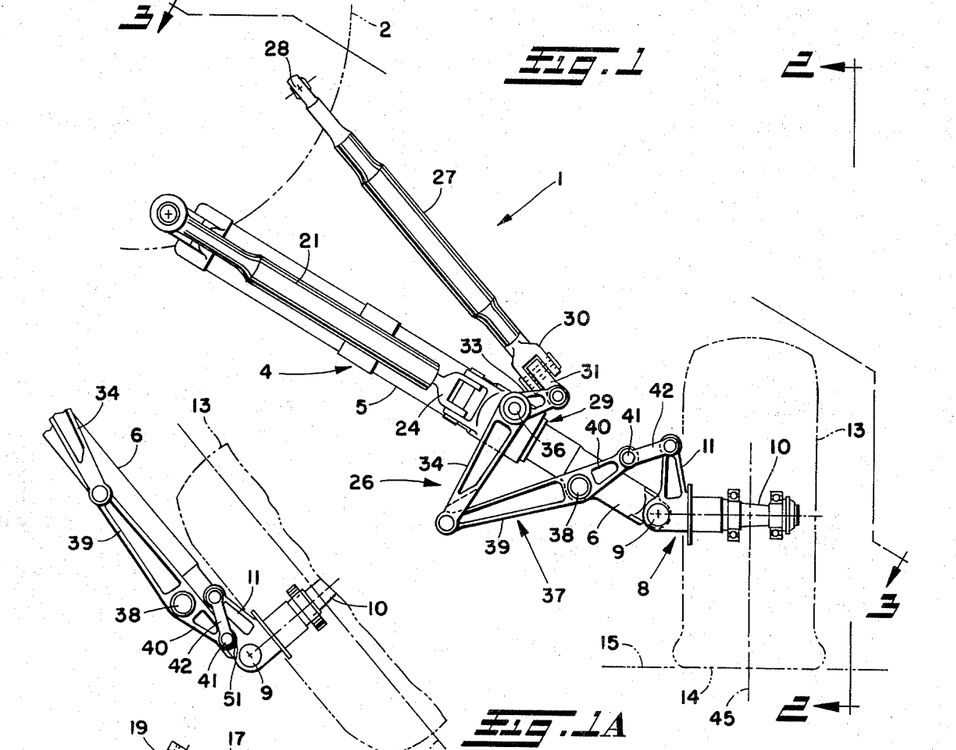
FIG. 1 is a front elevation of a landing gear according to the present invention showing such landing gear in its static support position.
FIG. 1A is a deatil fragmentary elevation showing the positions for the linkage extension and wheel support during landing gear retraction.
Figure 2:
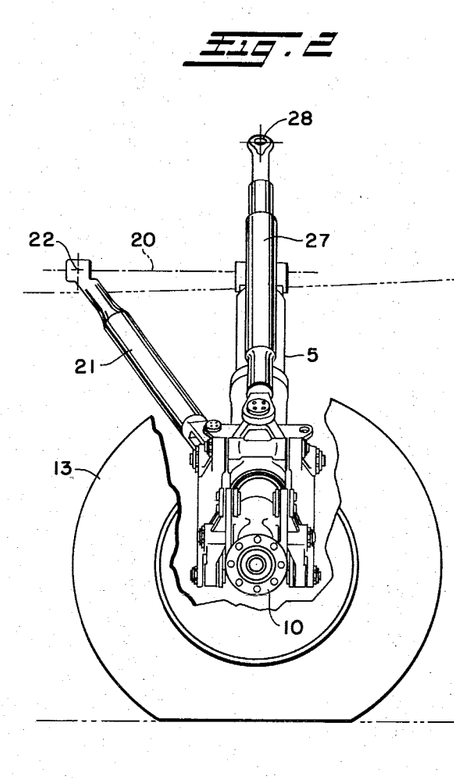
FIG. 2 is a partially broken away side elevation of the landing gear taken along line 2—2 of FIG. 1.

Referring now in more detail to FIGS. 1-4 of the drawings and initially to FIG. 1, the first embodiment of the landing gear of the present invention, indicated generally at 1, is shown in conjunction with a helicopter fuselage 2, although the particular aricraft type forms no part of the present invention except for the structural and cooperative interrelationship between the landing gear and the aircraft fuselage. Landing gear 1 acts, in conjunction with an identical mirror image landing gear on the opposite side of the fuselage, as the main support for the helicopter, with the front portion of the fuselage being supported on two castering nose wheels. Since the main landing gears are identical in construction, only one such landing gear will be described, with the understanding that the discussion applies equally to the other.

The landing gear of the first embodiment, as well as the other embodiments, may be retractible or non-retractible as desired. The specific means for landing gear retraction if used is not part of the present invention except for a linkage assembly extension that controls the pivotal position of the wheel support during retraction as disclosed in the first two embodiments discussed below.

A shock absorbing main oleo strut 4 extends outwardly and downwardly from the aircraft fuselage 2 and consists of a piston-cylinder assembly. Such assembly includes a cylinder 5 having a bore in which a piston slidingly reciprocates correspondingly to position telescoping piston rod 6, which forms the free end of the oleo strut. When the landing gear is extended from its retracted position, fluidic pressure of selected magnitude is maintained on the head end of the piston to extend the piston rod and absorb load energy on landing.

An L-shape wheel support 8 is pivotally connected at 9 to the end of piston rod 6. Such wheel support has a generally horizontally oriented axle spindle 10 and a generally vertically oriented retraction control arm assembly 11. A wheel with mounted tire 13 is journalled on axle spindle 10, the tire having a tread portion 14 which engages the ground or runway surface 15 during landing and support phases.

At its inboard or upper end, cylinder 5 of oleo strut 4 is formed with clevis 17 by which such oleo strut is pivotally attached at 19 to the aircraft fuselage for pivotable movement about axis 20. The inboard end of drag brace 21 is pivotally connected to fuselage 2 at 22, such pivotal connection being positioned along axis 20. Such drag brace 21 extends diagonally downwardly and is connected at its other end by clevis 24 to lugs 25 on the sides of cylinder 5. Such support brace rigidifies the landing strut against longitudinal forces developed during landing, while permitting such strut to pivot about axis 20.

The shock absorbing oleo strut 4 may assume a plurality of positions relative to the aircraft fuselage depending upon operational condition. The oleo strut will pivot about axis 20 during landing, with the landing forces compressing the oleo strut by inwardly telescoping the piston rod. Such upward movement is resisted by the fluid spring of oleo strut 4 so that the wheel assembly is resiliently urged downwardly with respect to fuselage 2 for supporting the weight of the aircraft. The pivotal movement of the oleo strut results in two component motion vectors for the wheel assembly and mounted tire; namely, an upwardly directed vertical vector and an outwardly directed horizontal vector. The latter, without correction, results in scuffing of the tire due to lateral movement along the ground. On the other hand, the inward telescoping of piston rod 6 results in a laterally inwardly directed horizontal motion vector for the wheel assembly. The linkage assembly of the present invention, generally indicated at 26 is designed to maintain the engagement portion of the tire in a vertical plane of fixed lateral distance from the fuselage by controlling the inwardly directed piston rod movement according to oleo strut position so that the two differently directed horizontal vectors are of substantially equal magnitude.

Figure 3:
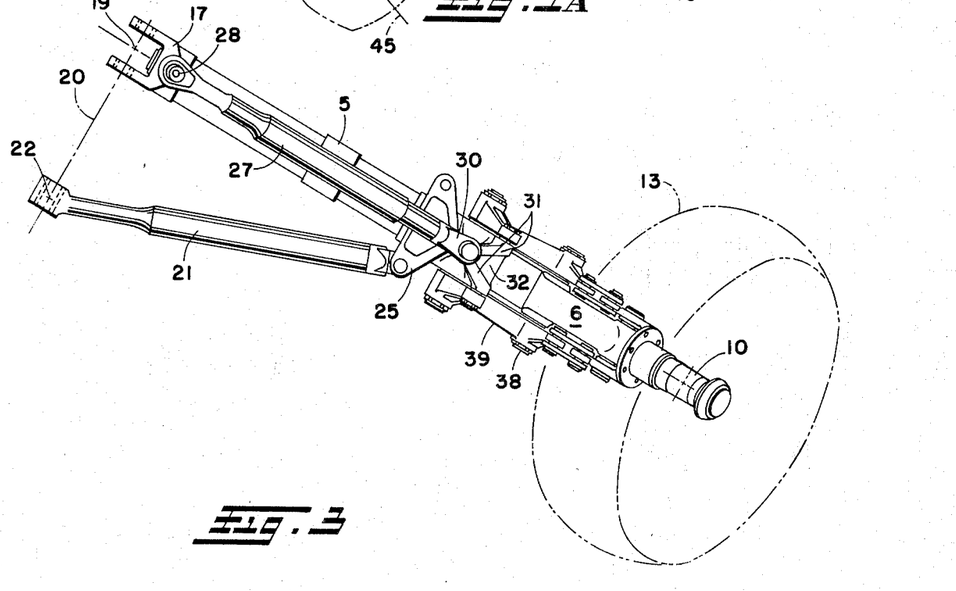
FIG. 3 is a top plan view of the landing gear taken along line 3—3 of FIG. 1.

Linkage assembly 26 includes fixed length connecting rod or strut 27 pivotally mounted at its inner end to fuselage 2 at 28 and connected at its outer end to a swing link or lever mechanism 29. As best shown in FIG. 3, fixed length strut 27 is above but vertically aligned with oleo strut 4. The outer connection of strut 27 is effected by a terminal clevis 30 receiving bifurcated rod extension 31, which terminates in sleeve 32 through which an elongated torque bolt extends for pivotal connection of the fixed length rod to the swing link mechanism.

Such swing link mechanism consists of two identically formed V-shape links having upper arms 33 and elongated lower arms 34. At the intersection of arms 33, 34, the swing links are pivotally connected to opposite sides of cylinder 5, as shown at 36.

Two identical, longitudinally spaced apart control levers 37 are pivotally connected at their inner ends to the bottom ends of elongated arms 34 of the swing links. Such levers are intermediately pivotally connected to opposite sides of telescoping piston rod 6 of the oleo strut as shown at 38, thereby to form lever arms 39 and 40. Such intermediate lever connection forms a torque arm couple between cylinder 5 and piston rod 6 to prevent relative rotation between the same, while permitting and controlling relative axial movement therebetween as will be discussed in more detail below.

The linkage assembly is formed with an extension for controlling wheel position on retraction. Such extension includes lever arms 40 which are pivotally connected at 41 to inner ends of connecting links 42, which in turn are pivotally connected to the distal ends of retraction control arms 11 on wheel support 8. Lever arms 40 thus pivot about 38 in an angular direction opposite to the angular movement of connection links 42, whereby an oscillating linkage is formed between two points of variable separation, that is the ends of control arms 11 and pivot point 38 on piston rod 6. Such oscillating linkage controls the pivotal inclination of wheel support 8 relative to piston rod 6 during retraction of the landing gear as will be discussed below.

OPERATION OF THE FIRST EMBODIMENT

Figure 4:
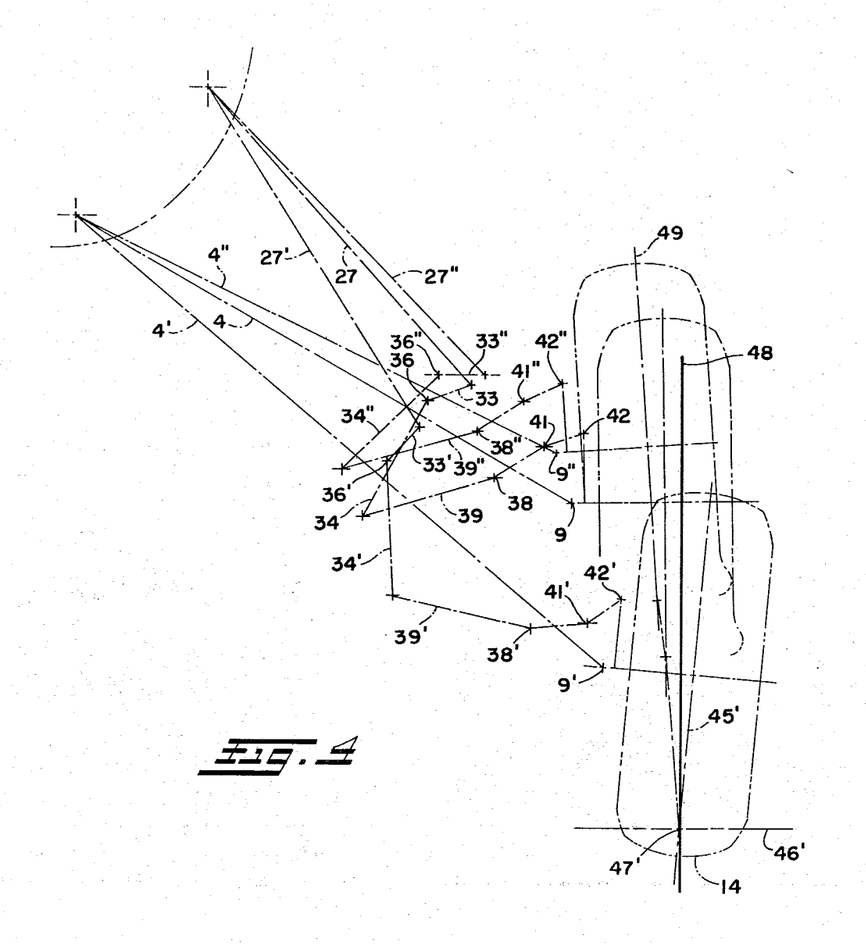
FIG. 4 is a schematic front elevation similar to FIG. 1 showing the kinematic operation of the landing gear for three representative operational conditions.

Referring now to FIG. 4, the operation of the landing gear in its extended position has been schematically illustrated with reference to three different representative operational phases; namely, the fully extended position of the landing gear immediately before landing or immediately after take-off, the static support position of the landing gear, and the fully compressed position of the landing gear. The various positions of common linkage assembly pivot points are identified by common reference numerals as defined above, with the numerals being unprimed for the static support position, primed for the fully extended position, and double primed for the fully compressed position.

Considering the fully extended position first, fluidic pressure on the head side of the piston in oleo strut 4 causes the piston rod 6 to advance outwardly to a preselected extended position and the oleo strut to pivot downwardly with respect to the fuselage. Such outward movement of the piston rod causes swing link mechanism 29 to pivot in a counterclockwise direction, and also results in control lever 37 pivoting in a clockwise direction. Such pivotal movement of lever 37 causes the oscillating linkage couple to move downwardly at its center pivot point 41. Therefore, the mid circumferential plane of the tire 45' from the potential ground engaging surface or plane 46' to the top of the tire is inclined slightly outwardly with respect to the aircraft fuselage before landing or after take-off. The center point 47' of the potential ground engagement plane 46' for the tire establishes the lateral tread distance from the fuselage which should be maintained during landing and support to eliminate scuffing of the tire. Such vertical plane is illustrated in FIG. 4 by line 48 which extends substantially perpendicularly to the potential ground engagement plane 46' of the tire.

When force is applied to the landing gear by tire tread 14 engaging the ground 15, the landing gear moves arcuately upwardly relative to the fuselage (as shown at 4") about axis 20 and piston rod 6 telescopes inwardly. Initial contact between the tire and the ground creates the greatest forces so that the wheel support and oleo strut experience maximum pivotal movement at that time. The concurrent pivotal movements of the wheel support and oleo strut are interrelated by linkage assembly 26 to control extension of piston rod 6.

Due to the different arcs described about different fixed fulcrums, the upward movement of oleo strut 4 and connecting rod 27 to positions indicated at 4" and 27" causes swing link mechanism 29 to pivot about axis 36 in a clockwise direction to draw the end of elongated arm 34 inwardly to position 34". Such inward movement of elongated arm 34 pivots lever 37 in a counterclockwise direction until such lever and the oscillating linkage couple are essentially in straight line orientation which occurs approximately three-fourths of the way through the vertical component of movement. The linkage is designed to control the natural compressive retraction of the piston rod on landing so that the horizontal vector of oleo strut pivotal movement is cancelled by inward telescoping of the piston rod. Such control as discussed above is obtained by a four bar linkage consisting of fixed length rod 27, swing link 29, arm 39, and the oleo strut cylinder from 19 to 36.

The forces on the landing gear are somewhat reduced for static support loading so that in the transformation from the fully compressed position to the position for static loading, the piston rod 6 is advanced slightly outwardly and the oleo strut pivots slightly downwardly with respect to the fuselage. Such movements of the oleo strut and piston rod result in counterclockwise movement for the swing link mechanism 38, although lever 39 remains substantially in its linear orientation with respect to the linkage extension.

It will thus be appreciated that the linkage assembly described is operative to control piston rod extension according to the angular position of the oleo strut relative to the fuselage. Such control theoretically results in the center point 47' of the ground engagement plane following a path 49 inclined slightly inwardly with respect to the fuselage; however, the structural members flex slightly under loading resulting in point 47' remaining in perpendicular plane 48 during the landing the support modes.

After the helicopter has taken off, the landing gear, if retractible, may be withdrawn from its extended position to a position within a landing gear well in the fuselage. The mechanism for retraction of the landing gear per se is not part of the present invention; however, linkage control of wheel support position during retraction does form part of the invention. Such control is effected by the linkage extension or oscillating linkage couple. More specifically, the piston rod 6 during retraction is initially advanced outwardly beyond the degree of extension immediately prior to landing. As shown in FIG. 1A, the oscillating linkage couple has doubled back upon itself with pivot 41 riding along the arcuate surface 51 of the wheel support. Such movement of the oscillating linkage couple rotates the wheel support in a counterclockwise direction about pivot 9 until the mid circumferential plane of the tire 45 is substantially parallel to the axis of the oleo strut. Such control of the wheel support and tire position during retraction allows the landing gear readily to be received in the well of the fuselage.

DETAILED DESCRIPTION OF THE SECOND EMBODIMENT

Figure 5:
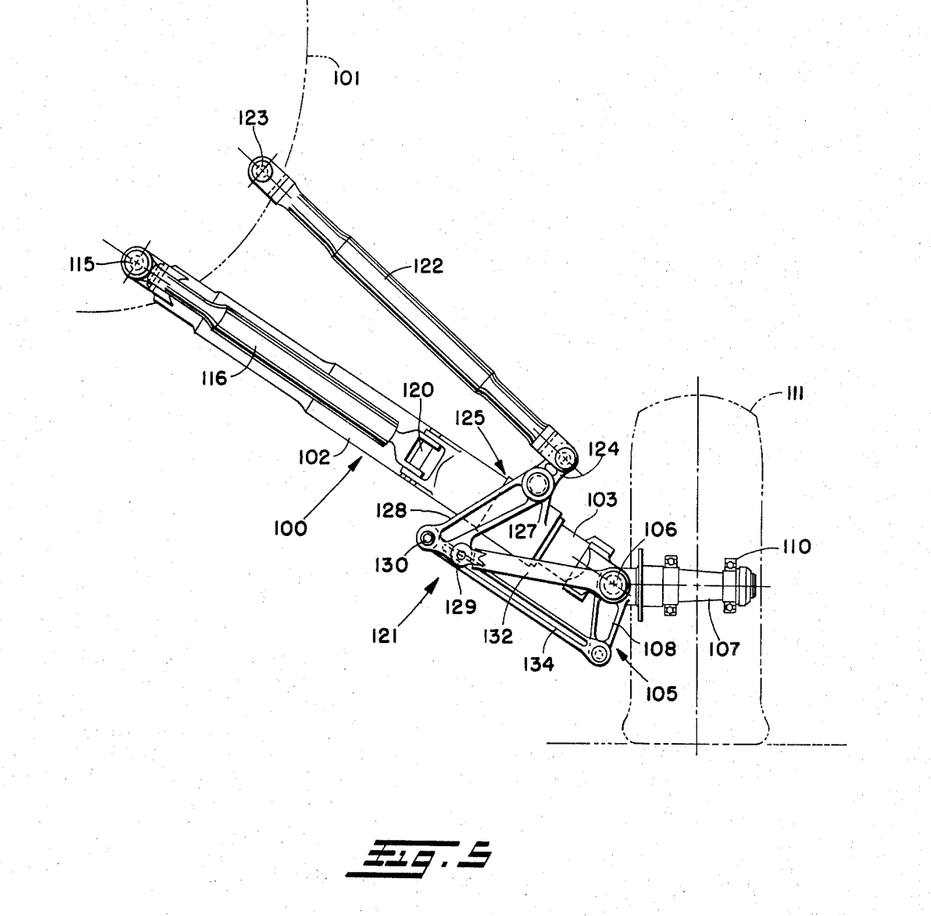
FIG. 5 is a front elevation similar to FIG. 1 showing a second embodiment of the present invention in static support position.
Figure 6:
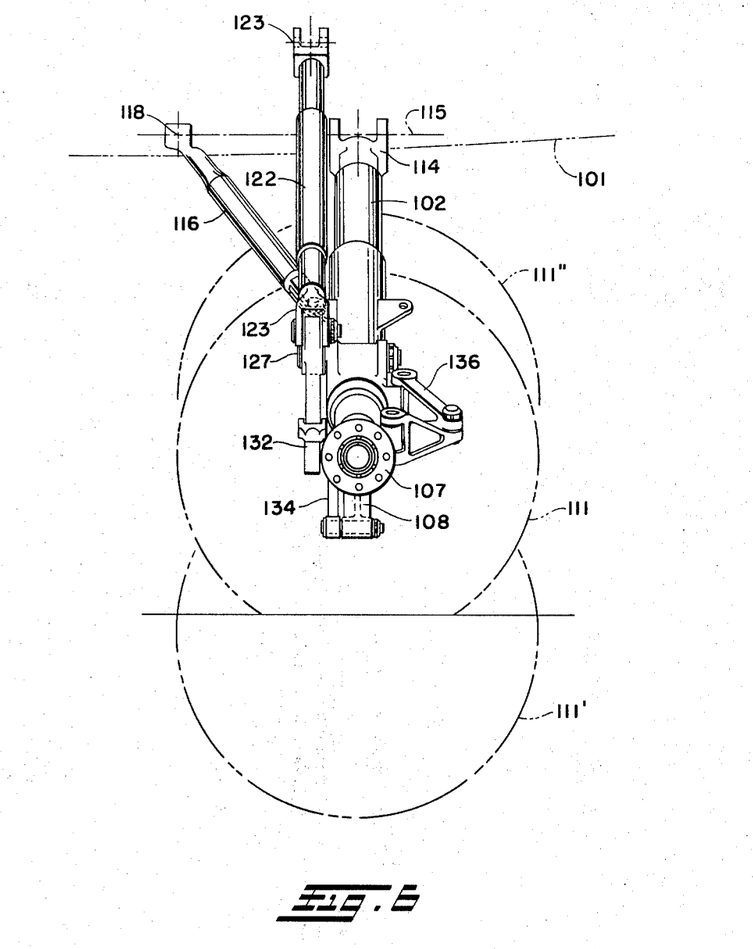
FIG. 6 is a side elevation of the landing gear illustrated in FIG. 5, with the phantom lines indicating two other representative operational positions of the landing gear tire.

Referring now to FIGS. 5 and 6, a second embodiment for the landing gear of the present invention is illustrated. Such second embodiment includes an oleo strut 100 extending outwardly and downwardly from the fuselage 101. Such oleo strut consists of a cylinder 102 having a bore therein in which a piston slidingly reciprocates. The piston rod 103 of the piston-cylinder assembly forms the free end of the landing gear.

A substantially L-shape wheel support 105 is pivotally connected to the end of piston rod 103 as shown at 106. Such wheel support includes axle spindle 107 and a downwardly extending control arm 108. A wheel (not shown) is journalled to the axle spindle by bearings 110 and a pneumatic tire 111 is mounted to the wheel in a well known manner.

The inner end of the oleo strut is connected by terminal clevis 114 to the fuselage to pivot about axis 115. The inner end of drag brace 116 is pivotally connected to the fuselage 101 at 118, such pivotal connection being longitudinally spaced from but axially aligned with pivot 114 for oleo strut 100. Drag brace 116 extends downwardly and rearwardly from the fuselage to its pivotal connection at 120 to cylinder 102 of oleo strut 100.

The linkage assembly indicated generally at 121 for the second embodiment includes a fixed length rod 122 pivotally connected at its inner end to the fuselage as shown at 123. Fixed length rod 122 is above and substantially vertically aligned with oleo strut 100. The outer end of rod 122 terminates in clevis 123 by which such connecting rod is pivotally joined to one end 124 of swing link or lever 125.

Closely adjacent end 124, swing link 125 is pivotally connected to cylinder 102 of oleo strut 100 as shown at 127. The other end 128 of the swing link 125 is formed with two longitudinally offset connection ears 129, 130, with the former being in the plane of the swing link and the latter being behind such plane as viewed in FIG. 5. A control rod 132 extends between ear 129 and the end of the piston rod 103 to control the extension of such piston rod. A connection link 134 extends between ear 130 and the end of retraction control arm 108 on wheel support 105, thereby to control pivotal position of such wheel support during the landing gear retraction phase. On the side or back of oleo strut 100 conventional torque arms 136 are provided to interconnect cylinder 102 and piston rod 103 to permit relative axial movement while precluding relative rotation.

OPERATION OF THE SECOND EMBODIMENT

When the aircraft is airborne and the landing gear of the second embodiment extended for landing, the fluidic pressure at the head end of the piston urges the piston rod to a preselected degree of extension and rotates the oleo strut in a clockwise direction as viewed in FIG. 5. Such movement of the piston rod results in downwardly and outwardly directed motion for control rod 132, which in turn pivots swing link 125 in a counterclockwise direction. Before landing, tire 111 is in the position identified by reference numeral 111' in FIG. 6.

When the tire engages the ground, the oleo strut will pivot upwardly with respect to the fuselage about axis 115. Such pivotal movement of the oleo strut results, without correction, in an upwardly directed vertical vector and an outwardly directed horizontal vector for the wheel assembly and mounted tire, the latter vector being undesirable for performance characteristics and tire life. Accordingly, the linkage assembly of the present invention controls the normal compression of oleo strut 100 so that the wheel support moves inwardly a distance equal to the outwardly directed movement caused by pivotal movement of the strut. The telescopic movement is controlled by the linkage assembly in proportion to the relative oleo strut rotation. Such control is effected by a four bar linkage consisting of fixed length strut 122, swing link 125, control arm 132, and the oleo strut cylinder between points 114 and 127. The linkage is designed to compensate for slight flexing of the structural elements during landing and support so that the ground engagement portion of the tire is maintained in a vertical plane of fixed lateral distance from the fuselage during operation.

During upward pivotal movement of the oleo strut, fixed length strut 122 and oleo strut 100 describe arcs of different radii about different fixed fulcrum points, thereby resulting in the swing link 125 pivoting in a clockwise direction as viewed in FIG. 5. Such clockwise pivotal movement of the swing link draws control rod 132 upwardly and inwardly thereby to regulate the natural compressive telescopic movement of the piston rod caused by application of the landing forces on the oleo strut. Therefore, the normal inward telescopic movement of the piston rod or extension of the oleo strut is controlled by the swing link which is regulated through the different arcs of rod 122 and oleo strut 100.

The maximum forces are experienced during initial contact with the ground resulting in maximum compression of the oleo strut, with the tire 111 assuming the fully compressed position 111" shown in FIG. 6. During static support conditions for the aircraft, the forces on the wheel assembly are reduced resulting in the piston rod being forced outwardly by the pressurized fluid at the head of the piston and further resulting in the oleo strut being pivoted downwardly. Such piston rod and oleo strut movement results in slight counterclockwise pivotal movement in the swing link 125, which in turn results in the control arm 132 advancing outwardly and slightly downwardly. The outwardly directed movement of the piston rod counteracts the inwardly directed horizontal vector of the same caused by the oleo strut pivoting downwardly to eliminate tire scuffing. The static loading or support position is illustrated in FIG. 5 of the drawings.

During retraction, piston rod 103 is initially advanced further outwardly whereby connection link 134 is likewise driven outwardly through its indirect connection to the piston rod by control link 132 and swing link 125. Such outward movement of the connection link results in wheel support 105 being pivoted in a counterclockwise direction about pivot 106 to throw the mid circumferential plane of the tire into a position substantially parallel with the axis of the oleo strut. Such positioning of the tire permits the landing gear readily to be retracted into the well in fuselage 101.

DETAILED DESCRIPTION OF THE THIRD EMBODIMENT

Figures 7, 8:
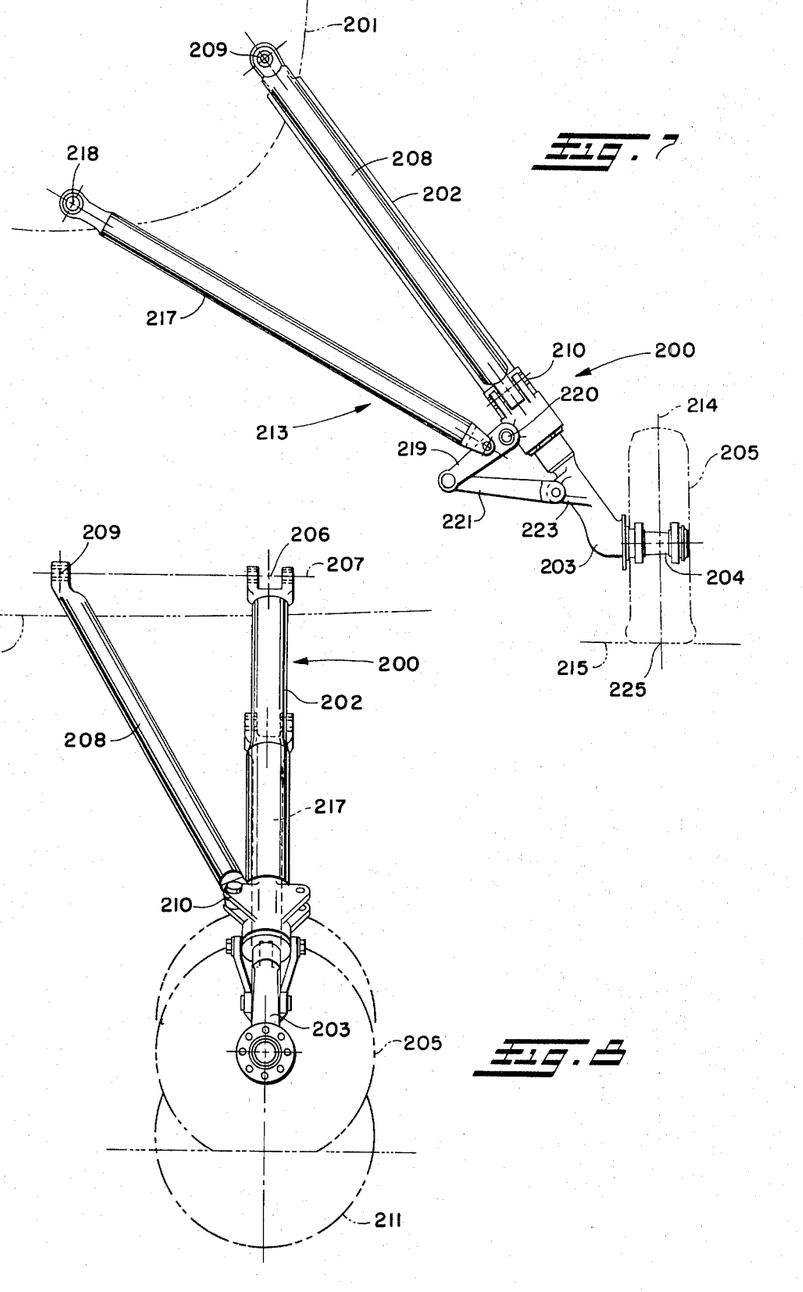
FIG. 7 is a front elevation similar to FIG. 1 showing a third embodiment of the present invention in static support position.
FIG. 8 is a side elevation of the landing gear illustrated in FIG. 7, with the phantom lines indicating two other representative operational positions of the landing gear tire.

Referring now to FIGS. 7 and 8, a third embodiment for the landing gear of the present invention is illustrated. Such third embodiment includes an oleo strut 200 extending outwardly and downwardly from the fuselage 201. Such oleo strut consists of a cylinder 202 having a bore therein in which a piston slidingly reciprocates. The piston rod 203 of the piston-cylinder assembly forms the free end of the landing gear. At its terminal end, the piston rod is flared outwardly to form a horizontal axle spindle 204. A wheel (not shown) is journalled to such axle spindle and has a tire 205 mounted thereon.

The inner end of the oleo strut is pivotally connected at 206 to the fuselage and pivots about axis 207. A drag brace 208 is also pivotally connected to the fuselage along axis 207 at a position longitudinally forwardly of the oleo strut pivotal connection as indicated at 209. Such drag brace 208 extends downwardly and rearwardly to a pivotal connection with the cylinder of the oleo strut as illustrated at 210. The oleo strut and drag brace during the operational modes of the landing gear can thus pivot arcuately about axis 207.

Three different operational modes are representative of the oleo strut movement during landing. The first, which is illustrated by phantom line 211 in FIG. 8, is the position the landing gear tire assumes just prior to landing. Upon contact with the ground or runway, the oleo strut and drag brace pivot upwardly and outwardly with respect to the fuselage, which without correction, would result in the tire moving outwardly with respect to the fuselage thereby to result in tire scuffing. A linkage assembly, indicated generally at 213, has been provided to control the natural compression of the oleo strut so that the inwardly directed telescopic movement of the piston rod has a horizontal vector substantially equal in magnitude to the outwardly directed horizontal vector caused by arcuate movement of strut 200. Such control results in the mid circumferential plane 214 of the tire intersecting the ground or runway 215 at a fixed lateral distance from the fuselage during all landing and support modes of landing gear 200.

The linkage assembly 213 consists of a fixed length strut or rod 217 pivotally connected at its inner end to the fuselage as indicated at 218. Such fixed length connecting rod is below but vertically aligned with the oleo strut as shown by the hidden lines in FIG. 8.

At its outer end, the fixed length strut is pivotally connected to link 219, which is pivotally connected at 220 to cylinder 202 of the oleo strut. The other end of link 219 is pivotally connected to the inner end of control link 221 which in turn is pivotally connected to lug 223 on piston rod 203. Link 219 and control link 221 thus form a toggle joint connecting cylinder 202 to piston rod 203. Such toggle joint not only cooperates in the control of oleo strut extension but also functions as a torque arm couple to permit axial telescopic movement of the piston rod with respect to the cylinder while precluding relative rotation therebetween.

The linkage assembly to control the relative axial positioning of the piston rod with respect to the cylinder in accordance with the relative angular position of the oleo strut to the fuselage thus consists of a four bar linkage. Specifically, such four bar linkage includes fixed link strut 217, link 219, control link 221, and the cylinder of the oleo strut between points 206 and 220.

OPERATION OF THE THIRD EMBODIMENT

The operation of the third embodiment of the present invention is best described by discussing three different operational phases: namely, the fully extended landing gear position just prior to landing, the landing gear orientation for full compression, and the landing gear orientation for static loading or support.

For the first such phase, the piston rod is advanced outwardly a preselected distance resulting in the oleo strut pivoting downwardly and inwardly with respect to the fuselage. Upon contacting the ground, the landing gear undergoes the maximum forces which result in oleo strut 200 pivoting upwardly with respect to the fuselage and the piston rod 203 telescoping inwardly with respect to cylinder 202. The extent of the inward telescopic movement of the piston rod is controlled by the linkage assembly 213 so that the outwardly directed horizontal vector resulting from pivotal movement of the oleo strut is cancelled by the inwardly directed horizontal vector caused by piston rod 203 telescoping within cylinder 202.

Specifically, such control is effected by the four bar linkage previously described, with two bars of fixed length, i.e. strut 215 and cylinder 202 between points 206 and 218, describing different arcs about different fulcrum points. This results in link 217 and control link 221 of the toggle joint being drawn inwardly one toward the other with the control link defining the magnitude of telescopic piston rod movement.

After full compression, the loading forces for static support are relatively reduced resulting in piston rod 203 advancing slightly outwardly and the oleo strut pivoting downwardly and inwardly. The degree of piston rod advancement is controlled by links 219 and 221 of the toggle joint separating slightly.

The linkage assembly is designed theoretically to move point 225 on the mid circumferential plane 214 of the tire along a slightly inwardly directed arc with respect to a plane perpendicular to the ground surface. However, during landing the oleo strut of the landing gear undergoes slight flexure resulting in a small outwardly directed horizontal vector for the tire. Therefore, the landing gear in operation maintains the tire a fixed lateral distance from the helicopter fuselage to eliminate tire scuffing.

DETAILED DESCRIPTION OF THE FOURTH EMBODIMENT

Figures 9, 10:
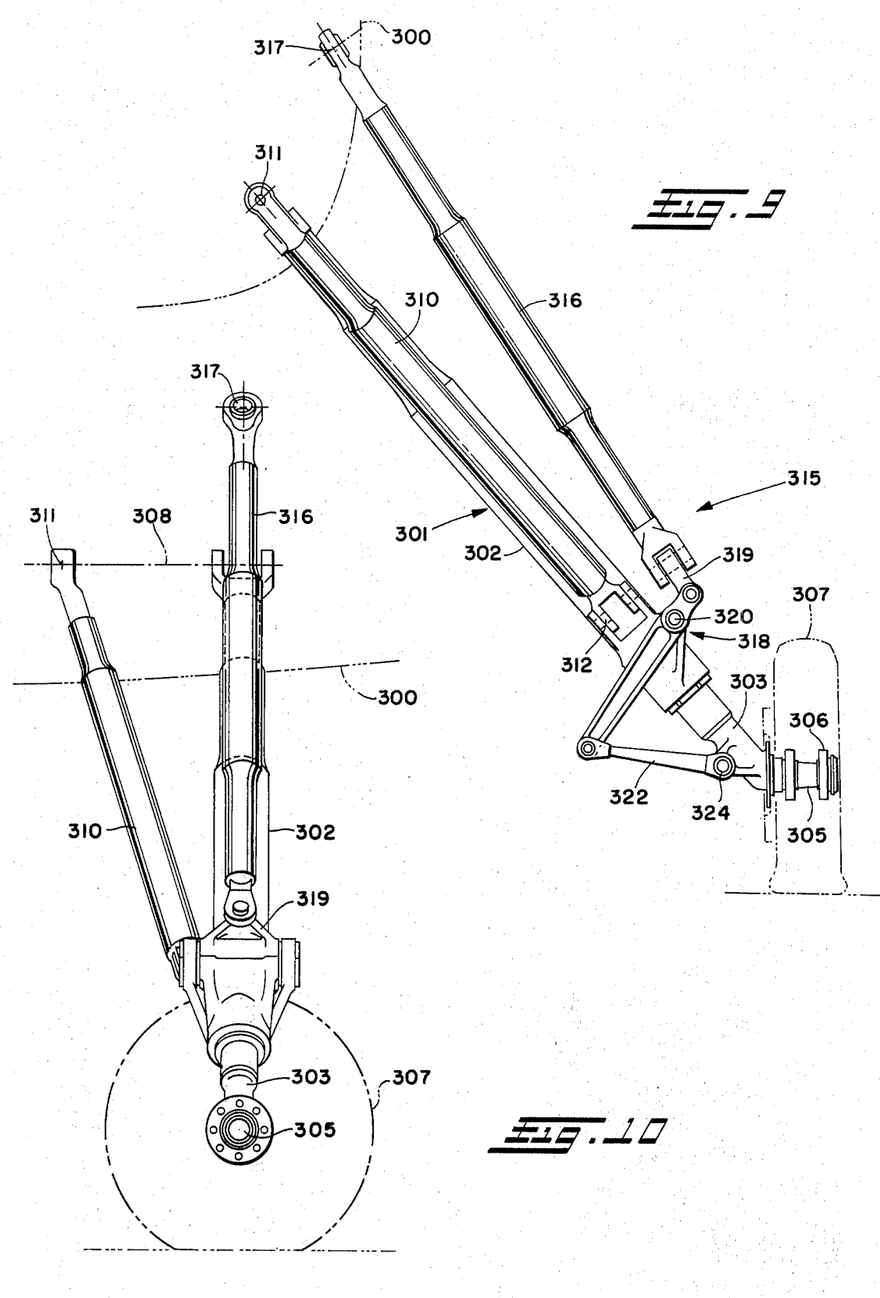
FIG. 9 is a front elevation similar to FIG. 1 showing a fourth embodiment of the present invention in static support position.
FIG. 10 is a side elevation of the landing gear illustrated in FIG. 9.

Referring now to FIGS. 9 and 10, a fourth embodiment of the present invention is illustrated. The fourth embodiment is similar to the embodiment first described except that the linkage assembly does not include a pivotal wheel support and linkage assembly extension.

More specifically, the fourth embodiment includes an oleo strut extending outwardly and downwardly from the fuselage 300. Such oleo strut 301 consists of a cylinder 302 having a bore therein in which a piston slidingly reciprocates. The piston rod 303 of the piston cylinder assembly forms the free end of the landing gear. As best shown in FIG. 9, the terminal end of the piston rod is outwardly flared to form a substantially horizontal axle spindle 305. A wheel (not shown) is journalled on the axle spindle by bearings 306, and a tire 307 is mounted thereon.

The inner end of the cylinder 302 is connected to the fuselage 300 for pivotal movement about axis 308. The inner end of a drag brace 310 is pivotally connected at 311 to the fuselage along axis 308. Such drag brace extends downwardly and rearwardly to a pivotal connection at 312 with cylinder 312 of the oleo strut. The landing gear can thus pivot about axis 308, such pivotal movement resulting, without correction, in the tire following an arc about axis 308 thereby resulting in the tire varying in its distance from the fuselage.

A linkage assembly generally indicated at 315 has been provided to control the telescopic movement of the piston rod with respect to the cylinder to compensate for the outwardly directed horizontal vector caused by arcuate oleo strut movement. Such linkage assembly includes a fixed length rrd 316 pivotally connected at its inner end to the fuselage by a spherical bearing as indicated at 317. At its outer end, the fixed length rod is connected to the top end of swing link 318 through a universal connection indicated at 319. The fixed length rod 316 is above but vertically aligned with oleo strut 301 as best shown in FIG. 10.

Intermediate its end and most closely adjacent the top, the swing link or lever 318 is pivotally connected at 320 to cylinder 302 of the oleo strut. The lower end of the swing link or lever is pivotally connected to a control link 322, which in turn is pivoted at its other end to the piston rod as indicated at 324.

OPERATION OF THE FOURTH EMBODIMENT

The fourth embodiment operates in the same manner as the first embodiment except it does not include a control feature for tire orientation during retraction. Specifically, the pivotal movement of swing link 318 about 320 resulting from two fixed length bars describing different arcs about different fixed fulcrums, controls the axial telescopic movement of the piston rod through control link 322 to maintain the tire a fixed lateral distance from fuselage 300 during all landing and support modes of the aircraft.

Therefore, it will be apparent from the above description that the four embodiments of the present invention maintain the ground contacting surface of the tire a fixed lateral distance from the fuselage for all operational positions of the landing gear. Due to the structural elements used, the landing gear of the present invention is also readily adapted to all types of aircraft, including planes requiring significant runway distances for take-off and landing.

The embodiments of the invention in which an exclusive property or privilege is claimed are defined as follows:

1. In combination with an aircraft fuselage, a landing gear comprising a shock absorbing oleo strut pivotally connected at one end to said fuselage, a tire rotatably mounted to the other end of said oleo strut, and linkage means constructed and arranged to control the extension of the oleo strut during landing and support modes of the aircraft in accordance with the pivotal position of the oleo strut relative to the fuselage, to maintain a ground contact portion of the tire along a vertical plane of fixed lateral spacing from the fuselage.

2. The landing gear set forth in claim 1 wherein a wheel support is pivotally connected to said other end of said oleo strut and the tire is rotatably mounted on such wheel support.

3. The landing gear set forth in claim 2 wherein said linkage assembly includes an extension adapted to control the pivotal position of the wheel support during retraction of the landing gear.

4. The landing gear set forth in claim 1 wherein a drag brace is pivotally joined to the fuselage along an axis through the pivot of the oleo strut, such drag brace extending rearwardly and downwardly to a connection with said oleo strut.

5. The landing gear set forth in claim 1 wherein the linkage means consists of a four bar linkage having two substantially vertically aligned bars of fixed length pivoted to the fuselage at different points.

6. The landing gear of claim 5 wherein the oleo strut comprises a piston-cylinder assembly and the other two bars of the linkage means form a toggle joint between the cylinder and the piston rod.

7. The landing gear of claim 6 wherein one fixed length bar is the oleo strut cylinder and the other fixed length bar is pivotally connected at its outer end to the toggle joint to control the relative positions of the links of the toggle joint and thus the extension of the piston rod relative to the cylinder.

8. The landing gear of claim 5 wherein the oleo strut comprises a piston-cylinder assembly and the other two bars of the linkage means comprise a swing lever intermediately pivoted to the cylinder and a control link pivotally connected to the swing lever and piston rod.

9. The landing gear set forth in claim 8 wherein one fixed length bar is the oleo strut cylinder and the other fixed length bar is pivotally connected at its outer end to the swing lever to control its angular position relative to the cylinder and thus the relative position of the control link, thereby to control the extension of the piston rod relative to the cylinder.

10. In combination with an aircraft fuselage, a landing gear comprising a shock abosrbing oleo strut pivotally connected at one end to said fuselage, said oleo strut consisting of a piston cylinder assembly with piston rod, a tire rotatably mounted to the free end of the piston rod of said oleo strut, and a four bar linkage means for controlling the extension of the oleo strut during landing and support modes of the aircraft in accordance with the pivotal position of the oleo strut relative to the fuselage, to maintain a ground contact portion of the tire along a vertical plane of substantially fixed lateral spacing from the fuselage, such linkage means including two vertically aligned fixed length bars pivoted to the fuselage, with one of such fixed length bars being the cylinder of said oleo strut, and the other two bars of said linkage interconnecting the free ends of said fixed length bars and the piston rod.

* * * * *